United States Patent
Walkling et al.

(10) Patent No.: US 9,239,240 B2
(45) Date of Patent: Jan. 19, 2016

(54) STORAGE MEDIUM FOR MAP DATA, METHOD FOR GENERATING MAPS, AND NAVIGATION DEVICE

(75) Inventors: Uwe Walkling, Barfelde (DE); Marco Fiedler, Diekholzen (DE); Henry Brandes, Woelpinghausen (DE); Holger Listle, Hildesheim (DE); Ralf Osmers, Hildesheim (DE); Thomas Klein, Alfeld (DE); Joerg Krewer, Pattensen (DE); Stefan Lueer, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1353 days.

(21) Appl. No.: 12/308,478

(22) PCT Filed: Sep. 14, 2007

(86) PCT No.: PCT/EP2007/059681
§ 371 (c)(1),
(2), (4) Date: Jul. 28, 2010

(87) PCT Pub. No.: WO2008/055730
PCT Pub. Date: May 15, 2008

(65) Prior Publication Data
US 2010/0292913 A1    Nov. 18, 2010

(30) Foreign Application Priority Data
Nov. 7, 2006  (DE) .......................... 10 2006 052 483

(51) Int. Cl.
| | |
|---|---|
| G01C 21/00 | (2006.01) |
| G05D 1/00 | (2006.01) |
| G05D 3/00 | (2006.01) |
| G06F 7/00 | (2006.01) |
| G06F 17/00 | (2006.01) |
| G01C 21/32 | (2006.01) |
| G09B 29/10 | (2006.01) |

(52) U.S. Cl.
CPC .............. *G01C 21/32* (2013.01); *G09B 29/106* (2013.01)

(58) Field of Classification Search
None
See application file for complete search history.

(56) References Cited

U.S. PATENT DOCUMENTS

| | | | | |
|---|---|---|---|---|
| 4,972,319 | A * | 11/1990 | Delorme | 340/990 |
| 6,911,918 | B2 * | 6/2005 | Chen | 340/995.13 |
| 7,373,353 | B2 * | 5/2008 | Adler et al. | 1/1 |
| 2002/0019224 | A1 | 2/2002 | Meyers | |

(Continued)

FOREIGN PATENT DOCUMENTS

| | | |
|---|---|---|
| DE | 10146785 | 4/2003 |
| WO | WO 01/33395 | 5/2001 |

OTHER PUBLICATIONS

International Search Report, PCT International Patent Application No. PCT/EP2007/059681, dated Dec. 17, 2007.

*Primary Examiner* — Ariel Yu
(74) *Attorney, Agent, or Firm* — Kenyon & Kenyon LLP

(57) ABSTRACT

A storage medium on which geographic data of a geographic region are stored together as map units, a corresponding method for generating a map from the geographic data, and a corresponding navigation device. In order to reduce the amount of data to be processed, the map units are structured hierarchically, map units of an $n^{th}$ order respectively corresponding to one geographic partial region, n being a natural number, and map units of an $(n+1)^{th}$ order respectively corresponding to one geographic subregion of one of the partial regions.

18 Claims, 4 Drawing Sheets

(56) References Cited

U.S. PATENT DOCUMENTS

| | | | |
|---|---|---|---|
| 2002/0116120 A1* | 8/2002 | Ruiz et al. | 701/208 |
| 2003/0236618 A1* | 12/2003 | Kamikawa et al. | 701/211 |
| 2005/0192720 A1* | 9/2005 | Christie et al. | 701/19 |
| 2006/0271280 A1* | 11/2006 | O'Clair | 701/208 |

\* cited by examiner

STORAGE MEDIUM FOR MAP DATA, METHOD FOR GENERATING MAPS, AND NAVIGATION DEVICE

FIELD OF THE INVENTION

The present invention relates to a storage medium on which geographic data of a geographic region are stored together as map units, a corresponding method for generating a map from the geographic data, and a corresponding navigation device.

BACKGROUND INFORMATION

Such navigation devices are installed in transportation devices such as motor vehicles, ships, and airplanes in order to navigate the driver of the transportation device from a current location to a desired destination. The navigation devices determine the current position of the transportation device, for example, using GPS (global positioning system), and calculate a recommended route using geographic data that are stored on a storage medium.

Such a navigation device is described in German Patent Application No. DE 101 46 785, which uses a storage medium on which geographic data are stored together as map units that respectively correspond to a geographic partial region, the geographic partial regions not overlapping. In this context, the geographic data relate to either a point, which is determined through its coordinates, or to lines or surfaces that are determined by their edge points and split at map unit boundaries. To calculate a recommended route, required map units are selected and completely read by the navigation device.

A disadvantage is that the individual map units also contain a lot of detailed information relating to geography, which is not always necessary for navigation. For this reason, the scope of the geographic data that must be read, stored, and processed by the navigation device is unnecessarily broad.

SUMMARY

An object of the present invention is to create a storage medium on which geographic data of a geographic region are stored together as map units, and to provide a corresponding method for generating a map from the geographic data, and a corresponding navigation device, whereby the amount of the data to be processed is reduced.

According to an example embodiment of the present invention, the map units are structured hierarchically, map units of an $n^{th}$ order respectively corresponding to a geographic partial region, n being a natural number, and map units of an $(n+1)^{th}$ order respectively corresponding to a geographic subregion of one of the partial regions of the present invention.

Advantageously, for navigation it is sufficient to load map units that do not contain all of the detailed information of a geographic partial region.

In a preferred specific embodiment, at least one map unit has geographic data of a specific type, and an identification is provided that indicates that the map unit has geographic data of the specific type.

Advantageously, map units having geographic data of a specific type may then be selected in a targeted manner for navigation.

According to an example embodiment of the present invention, a method is provided for generating a map out of geographic data of a geographic region that are stored together as map units, the map units being structured hierarchically, map units of an $n^{th}$ order respectively corresponding to a geographic partial region, n being a natural number, and map units of an $(n+1)^{th}$ order respectively corresponding to a geographic subregion of one of the partial regions, the method having the following steps:

selecting map units having relevant geographic data;
reading the selected map units having the relevant geographic data; and
composing the map from the relevant geographic data.

Advantageously, in particular the reading is carried out more quickly because not all detailed information stored for a geographical partial region has to be read.

In a preferred specific embodiment of the method according to the present invention, the selection of at least one of the selected map units having relevant geographic data is based on a relevant identification.

Advantageously, map units may be selected in a targeted manner with the aid of the identification, in order to evaluate geographic data of a specific type.

In an additional preferred specific embodiment of the method according to the present invention, at least one selected map unit does not have the first order.

Advantageously, it is possible to take into consideration more geographic data than is contained in the map units of the first order.

In another additional preferred specific embodiment of the method according to the present invention, map units having at least two different orders are selected.

Advantageously, it is possible to integrate additional geographic data for at least one partial region into the navigation without the need to process an equally large data density for other partial regions.

According to an example embodiment of the present invention, a navigation device is provided having a reading device that is set up to read hierarchically structured map units, map units of an $n^{th}$ order respectively corresponding to a geographic partial region, n being a natural number, and map units of an $(n+1)^{th}$ order respectively corresponding to a geographic subregion of one of the partial regions.

Advantageously, such a reading device makes it possible to read quickly the geographic data that are absolutely necessary for the navigation and that are stored in map units of the first and second order, for example, it also being possible to read detailed information that may be necessary in individual cases and that is stored in map units having a higher order.

In one preferred specific embodiment, the navigation device furthermore has a map generation device that is set up to generate a map from the hierarchically structured map units.

Advantageously, the map generation device allows for the generation of a map having precisely the information that is required in the individual case.

BRIEF DESCRIPTION OF THE DRAWINGS

The present invention is described in greater detail below with reference to figures.

DETAILED DESCRIPTION OF EXAMPLE EMBODIMENTS

Figure 1:
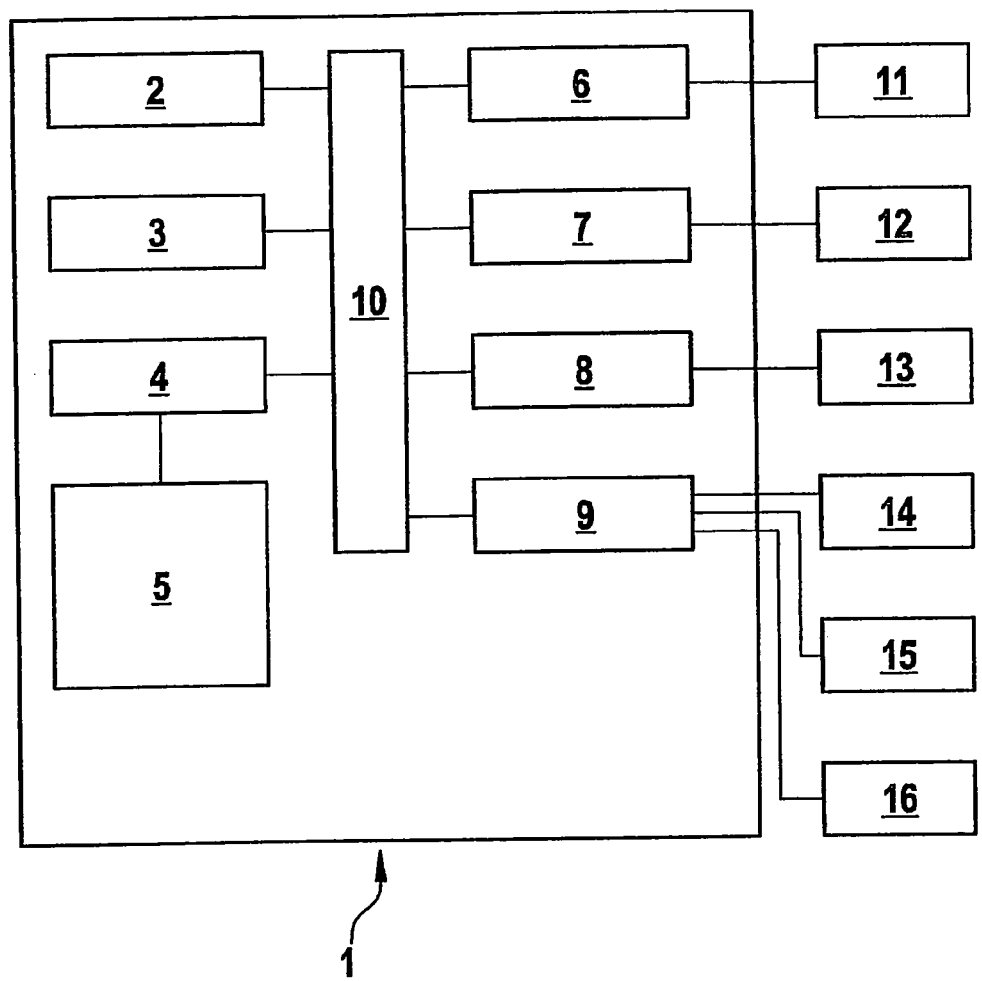
FIG. 1 shows a schematic view of a navigation system.

FIG. 1 is a schematic view of a navigation system having a navigation device 1 and further external devices 11 through 16 that are connected to navigation device 1.

Navigation device 1 has a map generation device 3, a reading device 4, a control device 10, and additional internal devices 2 and 6 through 9.

A storage medium 5 is an exchangeable CD-ROM (Compact Disc-Read Only Memory) or exchangeable DVD (Digital Versatile Disc), for example. Geographic data are stored on storage medium 5 and combined into map units. The map units respectively correspond to a geographic area, which is defined by longitude and latitude, for example, and are organized hierarchically. In this context, geographic data of the $n^{th}$ order are combined into map units of the $n^{th}$ order that respectively correspond to a geographic partial region, n being a natural number, and geographic data of the $(n+1)^{th}$ order are combined into map units of the $(n+1)^{th}$ order that respectively correspond to a geographic subregion of one of the partial regions. Map units of the first order form the highest hierarchy level. In addition to geographic data, the map units contain a unique identification number that is systematically established, so that it is possible to recognize the orders of the map units and where necessary their relative position to a higher-order map unit. Preferably, map units of the same order also have the same size (i.e., they encompass a geographic area of the same size) and are rectangular or even square. Further details regarding the map units, such as the geographical area to which they correspond, identifications indicating that they have geographic data of a specific type, and further attributes that contain more specific details regarding the geographic data, are stored in a data record of a structure file, for example.

Control device 10 controls map generation device 3, reading device 4, additional internal devices 2 and 6 through 9, and the data exchange between these.

Control device 10 first requests the structure file. Upon receiving a signal from one of the external devices 11 through 16, such as an input device, control device 10 then selects, on the basis of the structure file, specific map units that are to be read. Control device 10 causes reading device 4 to read the selected map units. Reading device 4 reads the selected map units, and control device 10 transmits them to map generating device 3. Map generating device 3 uses the selected map units to compose a map, which may then be transmitted by control device 10 to additional internal devices 2, 6 through 9. The following describes maps that the map generating device composes for a geographic region and that are used to navigate a motor vehicle.

Figure 2:
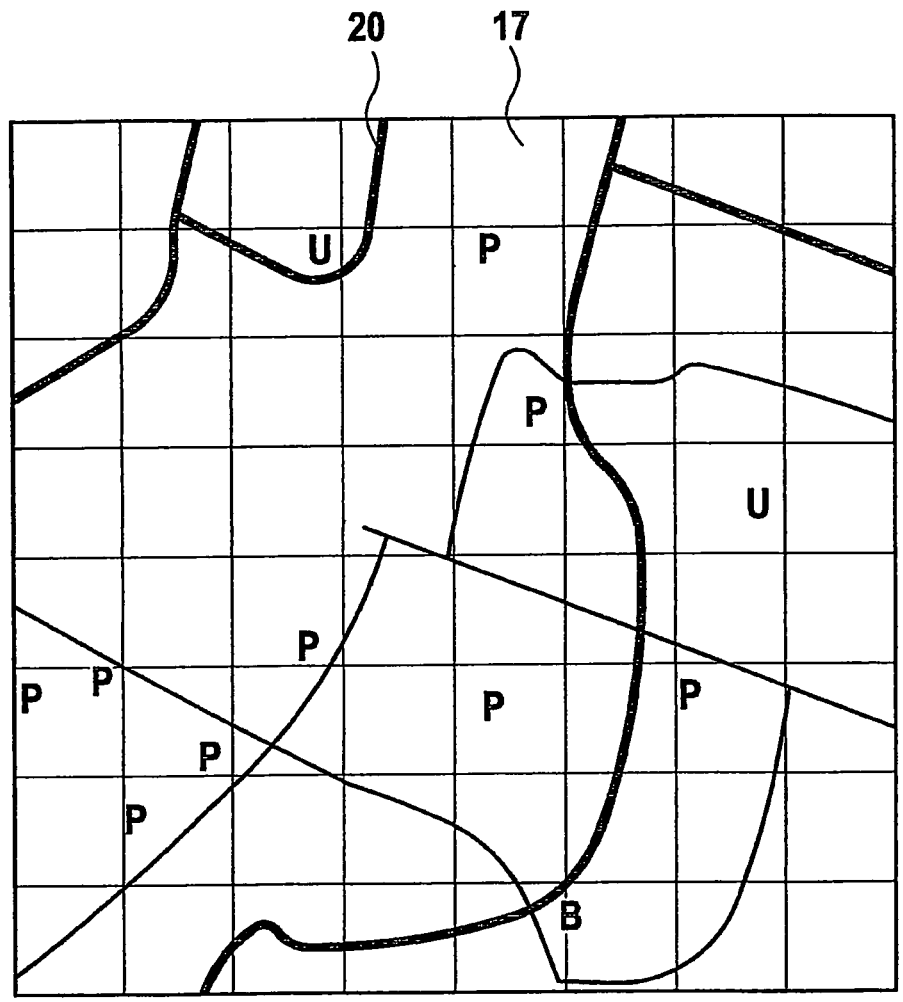
FIG. 2 shows a map that corresponds to a geographic partial region and is made up of hierarchically structured map units up to the fourth order.

FIG. 2 shows a map that corresponds to a geographic region, is made up of hierarchically structured map units up to the fourth order, and has the geographic data of all map units up to the fourth order in the geographic region that is represented. The geographic region represented by the map corresponds to a square map unit of the first order. The square map unit of the first order is subdivided into four map units of the second order, which in turn are respectively subdivided into four map units of the third order, which in turn are subdivided into four map units of the fourth order (quadtree). The boundaries of the square map units are represented as lines. Since the boundaries of the map units of lower order always coincide with boundaries of map units of higher order that are defined in the same subregion, the grid from FIG. 2 reflects the boundaries of map units 17 of the highest order, i.e., the fourth order. Roads are represented as curved lines 20. The thickness of the curved lines provides an indication about the significance of the respective road. The thicker the represented line, the more significant the represented road. Letters B, P, U represent train stations, parking lots, and subway stops, respectively.

Figure 3:
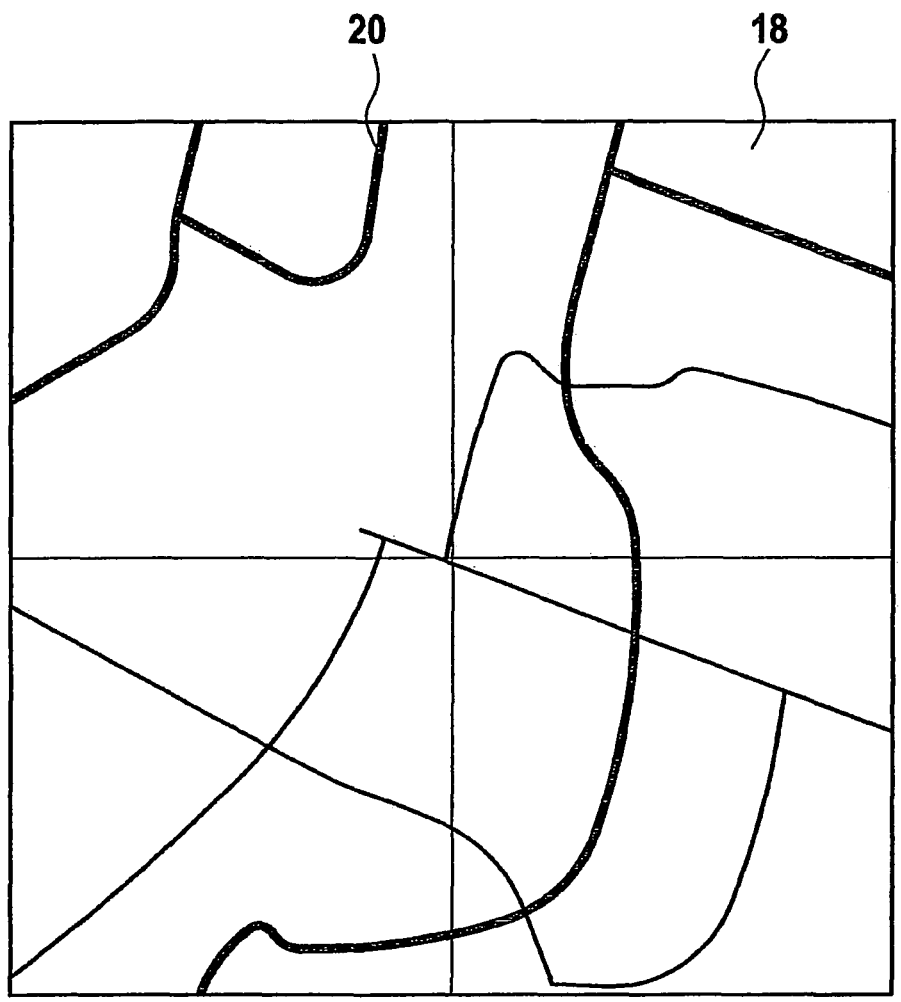
FIG. 3 shows a map that corresponds to the geographic partial region from FIG. 2 and is made up of hierarchically structured map units up to the second order.

FIG. 3 shows a map that corresponds to the geographic partial region from FIG. 2 and is made up of hierarchically structured map units up to the second order. These map units 18 of the second order do not illustrate any train stations B, subway stops U, and parking lots P, but rather only roads 20, which are stored as geographic data of the first order (thick line) or the second order (thinner line). Such a map could be used, for example, to calculate the route to a destination that is specified by an address.

Figure 4:
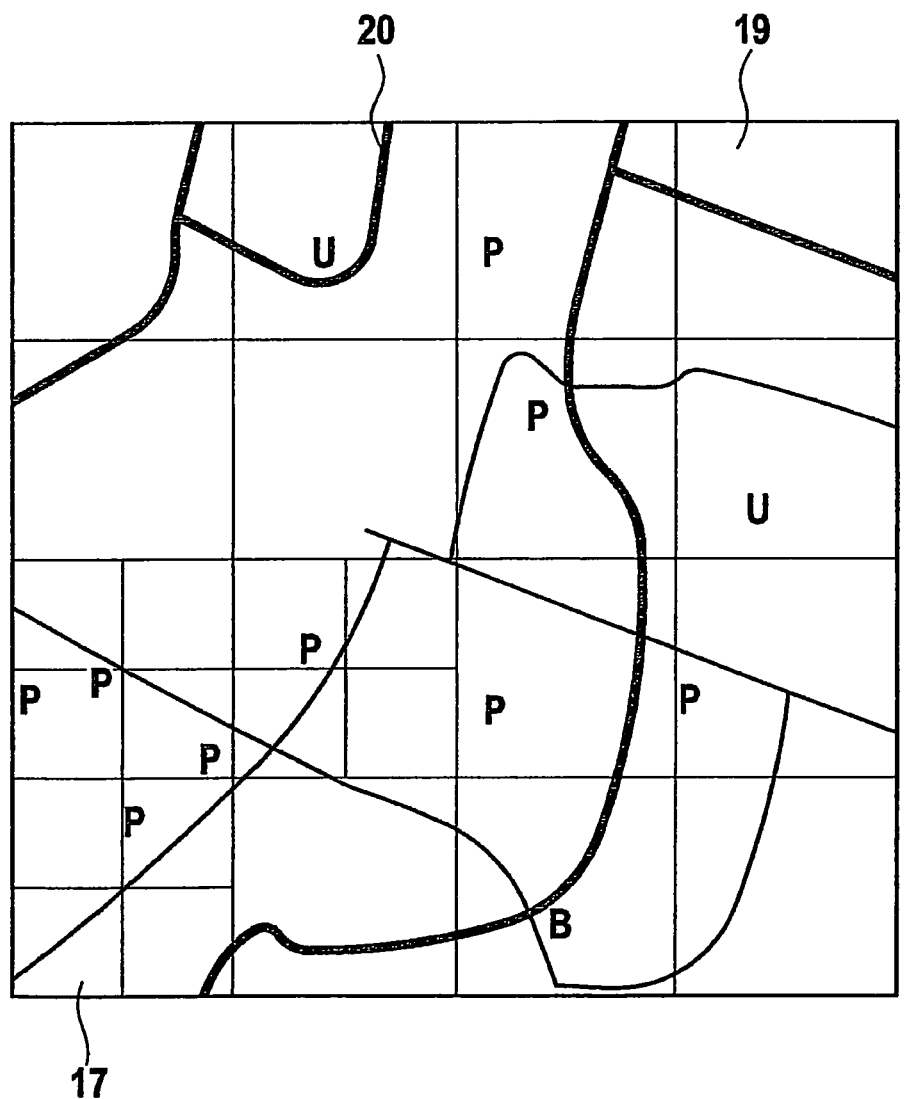
FIG. 4 shows a map that corresponds to the geographic partial region from FIG. 2 and that is made up of hierarchically structured map units up to the fourth order or of hierarchically structured map units up to the third order in subregions.

FIG. 4 shows a map that corresponds to the geographic partial region from FIG. 2 and that is made up of hierarchically structured map units up to the fourth order, or of hierarchically structured map units up to the third order, in subregions, as can be seen with the aid of the grid. All train stations B, subway stops U, and parking lots P are drawn in this map. Such a map results if train stations and subway stops are stored in map units 19 of the third order, for example, and parking lots P stored either in map units 19 of the third order or map units 17 of the fourth order, and control device 10 causes the reading device to read map units up to the order in which parking lots are stored. In this context, control device 10 selects the map units that are to be read with the aid of the identifications that are stored in the structure file and that specify in which map unit geographic data of the type "parking lot" are stored. Such a map is suited for finding a parking lot P that is as close as possible to a present position of the motor vehicle, for example, and at the same time for reducing the data quantity required for processing, since it does not require the geographic data from all map units of the fourth order.

A map that corresponds to the geographic partial region from FIG. 2 and is made up of hierarchically structured map units up to the third order is suited for the visual representation by a display device having a relatively low resolution, for example. Some of the parking lots P existing in the geographic area are not displayed, since these are stored in map units of the fourth order for subregions in which parking lots have a high density. This makes it possible to avoid a confusing representation of a confusing density of parking lots.

What is claimed is:

1. A non-transitory, computer-readable storage medium, having computer program instructions, which when executed by a processor perform a method for generating a map using geographic data of a geographic region that are stored together as map units, wherein the map units are hierarchically structured, map units of an $n^{th}$ order respectively correspond to a geographic partial region, n being a natural number, and map units of an $(n+1)^{th}$ order respectively correspond to a geographic subregion of one of the partial regions, the method comprising:

determining boundaries of the geographic region using map units of a first order;

querying map units of a map-unit database to select map units of at least one second order by reading identifiers that indicate that the selected map units contain a specified geographic data type, the at least one second order being higher than the first order, the selected map units being within the boundaries of the geographic region;

reading the selected map units of the at least one second order having the specific geographic data type from the map-unit database; and displaying a map image by simultaneously displaying data of the map units of the first order and the selected map units of the at least one second order;

wherein the displayed data of the map units of both the first and selected at least one second order include symbolic representations of the geographic data.

2. The non-transitory, computer-readable storage medium as recited in claim 1, wherein the identifiers are provided in the selected map units of the at least one second order.

3. The non-transitory, computer-readable storage medium as recited in claim 1, wherein the displaying the map image simultaneously displays data of the map units of the first order and the selected map units of the at least one second order in a first geographic partial region of the geographic region, and displays data of the map units of the first order without any of the selected map units of the at least one second order in a second geographic partial region of the geographic region.

4. The non-transitory, computer-readable storage medium as recited in claim 1, wherein the map units of the first order and the map units of the at least one second order are at least one of: square, or rectangular.

5. The non-transitory, computer-readable storage medium as recited in claim 1, wherein the map units of the first order and the map units of the at least one second order each respectively form a uniform rectilinear grid.

6. The non-transitory, computer-readable storage medium as recited in claim 1, wherein boundaries of the map units of the first order coincide with boundaries of each of the selected map units of the at least one second order having an order a single order higher than the order of the map units of the first order.

7. The non-transitory, computer-readable storage medium as recited in claim 1, wherein the map units of the at least one second order not containing the specified geographic data type are not read from the map-unit database.

8. The non-transitory, computer-readable storage medium as recited in claim 1, wherein each of the selected map units of the at least one second order that have the same order also have the same geographic size.

9. The non-transitory, computer-readable storage medium as recited in claim 1, wherein the map units of the first order include relatively thicker lines to represent relatively more significant roads, and the map units of the at least one second order include relatively thinner lines to represent relatively less significant roads.

10. The non-transitory, computer-readable storage medium as recited in claim 1, wherein the map units of the at least one second order include textual characters to represent at least one of: train stations, parking lots, or subway stops.

11. The non-transitory, computer-readable storage medium as recited in claim 1, wherein the method further comprises using the map units of the first order and the selected map units of the at least one second order to calculate a route.

12. A method for generating a map out of geographic data of a geographic region that are stored together as map units, the map units being hierarchically structured, map units of an $n^{th}$ order respectively corresponding to a geographic partial region, n being a natural number, and map units of an $(n+1)^{th}$ order respectively corresponding to a geographic subregion of one of the partial regions, the method comprising:

determining, by a processor, boundaries of the geographic region using map units of a first order;

querying, by the processor, map units of a map-unit database to select map units of at least one second order by reading identifiers that indicate that the selected map units contain a specified geographic data type, the at least one second order being higher than the first order, the selected map units being within the boundaries of the geographic region;

reading, by the processor, the selected map units of the at least one second order and having the specified geographic data type from the map-unit database; and displaying, by the processor, a map image by simultaneously displaying data of the map units of the first order and the selected map units of the at least one second order;

wherein the displayed data of the map units of both the first and selected at least one second order include symbolic representations of the geographic data.

13. The method as recited in claim 12, wherein the identifiers are provided in the selected map units.

14. The method as recited in claim 13, wherein the selecting includes selecting map units having at least two different orders higher than the first order.

15. A navigation device, comprising:

a memory;

a processor to read geographic data of a geographic region that are stored together as map units in the memory, the map units being hierarchically structured map units, map units of an $n^{th}$ order respectively corresponding to a geographic partial region, n being a natural number, and map units of an $(n+1)^{th}$ order respectively corresponding to a geographic subregion of one of the partial regions, the processor configured to control the memory to:

determine boundaries of the geographic region using map units of a first order;

query map units of a map-unit database to determine map units of at least one second order by reading identifiers that indicate that the selected map units contain a specified geographic data type, the at least one second order being higher than the first order, the selected map units being within the boundaries of the geographic region;

read the selected map units of the at least one second order having the specific geographic data type from the map-unit database; and display a map image by simultaneously displaying data of the map units of the first order and the selected map units of the at least one second order;

wherein the displayed data of the map units of both the first and selected at least one second order include symbolic representations of the geographic data.

16. A non-transitory, computer-readable storage medium having program instructions, which when executed by a processor perform a method for generating a map using geographic data stored as map units, the map units being hierarchically structured, map units of an $n^{th}$ order respectively corresponding to a geographic partial region, and map units of an $(n+1)^{th}$ order respectively corresponding to a geographic subregion of one of the partial regions, the method comprising:

determining, by the processor, boundaries of the geographic region using map units of a first order;

querying, by the processor, map units of a map-unit database to select map units of at least one second order by reading identifiers that indicate that the selected map units contain a specified geographic data type, the at least one second order being higher than the first order, the selected map units being within the boundaries of the geographic region;

reading, by the processor, the selected map units of the at least one second order having the specific geographic data type from the map-unit database; and composing, by the processor, the map by simultaneously including data of the map units of the first order and the selected map units of the at least one second order.

17. The non-transitory, computer-readable medium of claim 16, the method further comprising:

using the composed map to calculate a route to a specified destination.

18. The non-transitory, computer-readable medium of claim 16, the method further comprising:

displaying an image of the map;

wherein the displayed data of the map units of both the first and selected at least one second order include symbolic representations of the geographic data.

\* \* \* \* \*